(12) United States Patent
Waggle et al.

(10) Patent No.: US 7,546,786 B2
(45) Date of Patent: Jun. 16, 2009

(54) TOOLHOLDER WITH CHIP EJECTION SEGMENT THEREUPON

(75) Inventors: James M. Waggle, Derry, PA (US); Dennis W. McNamara, Greensburg, PA (US); Ronald L. Dudzinsky, Derry, PA (US); Larry R. Meenan, Greensburg, PA (US); Lewis Ray Morrison, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 119 days.

(21) Appl. No.: 11/397,172

(22) Filed: Apr. 4, 2006

(65) Prior Publication Data

US 2007/0231088 A1    Oct. 4, 2007

(51) Int. Cl.
*B23C 5/20* (2006.01)

(52) U.S. Cl. .............................. 82/1.11; 407/6; 407/33; 407/67; 407/115; 408/227

(58) Field of Classification Search ............ 407/2, 407/6, 33, 66, 67, 69, 101, 114, 115; 82/1.11; 409/232; 408/230, 227, 713, 231, 226
See application file for complete search history.

(56) References Cited

U.S. PATENT DOCUMENTS

| | | | | | |
|---|---|---|---|---|---|
| 85,107 | A | * | 12/1868 | Count | 408/224 |
| 867,639 | A | * | 10/1907 | Bragg | 408/223 |
| 2,322,894 | A | * | 6/1943 | Stevens | 408/230 |
| 2,392,285 | A | | 1/1946 | Gauthier | |
| 2,897,580 | A | * | 8/1959 | Huber | 407/4 |
| 2,911,707 | A | | 11/1959 | Almen | |
| 2,955,349 | A | | 10/1960 | York | |
| 3,059,316 | A | * | 10/1962 | Berry, Jr. et al. | 407/101 |
| 3,673,653 | A | | 7/1972 | Kaser | |
| 4,271,734 | A | | 6/1981 | Kimura et al. | |
| 4,975,003 | A | * | 12/1990 | Hosoi | 408/230 |
| 5,004,384 | A | * | 4/1991 | Hosoi | 408/230 |
| 5,160,232 | A | * | 11/1992 | Maier | 408/223 |
| 5,509,761 | A | * | 4/1996 | Grossman et al. | 408/59 |
| 5,622,462 | A | * | 4/1997 | Gakhar et al. | 408/230 |

(Continued)

FOREIGN PATENT DOCUMENTS

DE    3826239 A1  *  2/1990

(Continued)

OTHER PUBLICATIONS

International Preliminary Report on Patentability for PCT/US2007/0006968.

(Continued)

*Primary Examiner*—Boyer D Ashley
*Assistant Examiner*—Sara Addisu
(74) *Attorney, Agent, or Firm*—Matthew W. Gordon (57) ABSTRACT

A toolholder for use in a metalworking operation, with a body extending along a longitudinal axis and a recess extending within the first end of the body. Adjacent an insert pocket adapted to receive a cutting insert in the recess is at least one wall with a portion having a surface with multiple interruptions to form a chip ejection segment. The chip ejection segment may be an integral part of the toolholder body or may be a discrete piece removably attached to the toolholder body. A method of imparting to a toolholder such a chip ejection segment is also disclosed.

34 Claims, 8 Drawing Sheets

U.S. PATENT DOCUMENTS

| | | | |
|---|---|---|---|
| 5,873,683 A * | 2/1999 | Krenzer | 408/230 |
| 5,947,648 A | 9/1999 | Friedman et al. | |
| 5,984,592 A * | 11/1999 | Harper et al. | 407/40 |
| 6,004,081 A * | 12/1999 | Hellstrom et al. | 407/103 |
| 6,026,719 A | 2/2000 | Li | |
| 6,030,155 A * | 2/2000 | Scheer et al. | 408/59 |
| 6,213,692 B1 * | 4/2001 | Guehring et al. | 408/144 |
| 6,290,436 B1 | 9/2001 | Qvarth | |
| 6,739,808 B1 | 5/2004 | Ghosh | |

FOREIGN PATENT DOCUMENTS

| | | | |
|---|---|---|---|
| DE | 4241140 A1 * | 6/1994 | |
| JP | 06091416 A * | 4/1994 | |

OTHER PUBLICATIONS

Photographs of Seco plunging cutter (Feb. 2006)(4 pages).

* cited by examiner

TOOLHOLDER WITH CHIP EJECTION SEGMENT THEREUPON

BACKGROUND OF THE INVENTION

1. Field of the Invention

The present invention is directed to a toolholder for use in metalworking operations whereby a chip ejection segment is mounted upon or is an integral part of the toolholder.

2. Description of Related Art

A primary object of a metalworking operation is the shaping of a workpiece. Much attention is paid to the formation of metallic chips during the machining process, even though the chip is a waste product. The formation of the chips not only provides an indication of the efficiency of the metalcutting operation, but furthermore, if the chips are not properly evacuated from the working region, the chips may interfere with the metalworking operation by scraping against a finished metal surface or by accumulating in the working area.

It is the object of the invention to provide a mechanism for effectively ejecting chips formed during a metalworking operation from the working area.

SUMMARY OF THE INVENTION

The invention is directed to a toolholder for securing a cutting insert for use in a metalworking operation comprising a body extending along a longitudinal axis. The body has a first end and a recess extending into the first end, wherein the recess has an insert pocket adapted to receive a cutting insert. The body also has at least one wall adjacent to the pocket with a portion of the wall having a surface with multiple interruptions to form a chip ejection segment.

The invention is also directed to a method of imparting to a toolholder a chip ejection segment for use in a metalcutting operation. The toolholder has a body extending along a longitudinal axis. The body has a first end and a recess extending into the first end, with an insert pocket therein adapted to receive a cutting insert. The method comprises the step of imparting within at least one wall of the recess and at a location adjacent to the pocket a surface with multiple interruptions to form a chip ejection segment.

DESCRIPTION OF THE PREFERRED EMBODIMENTS

Figure 1:
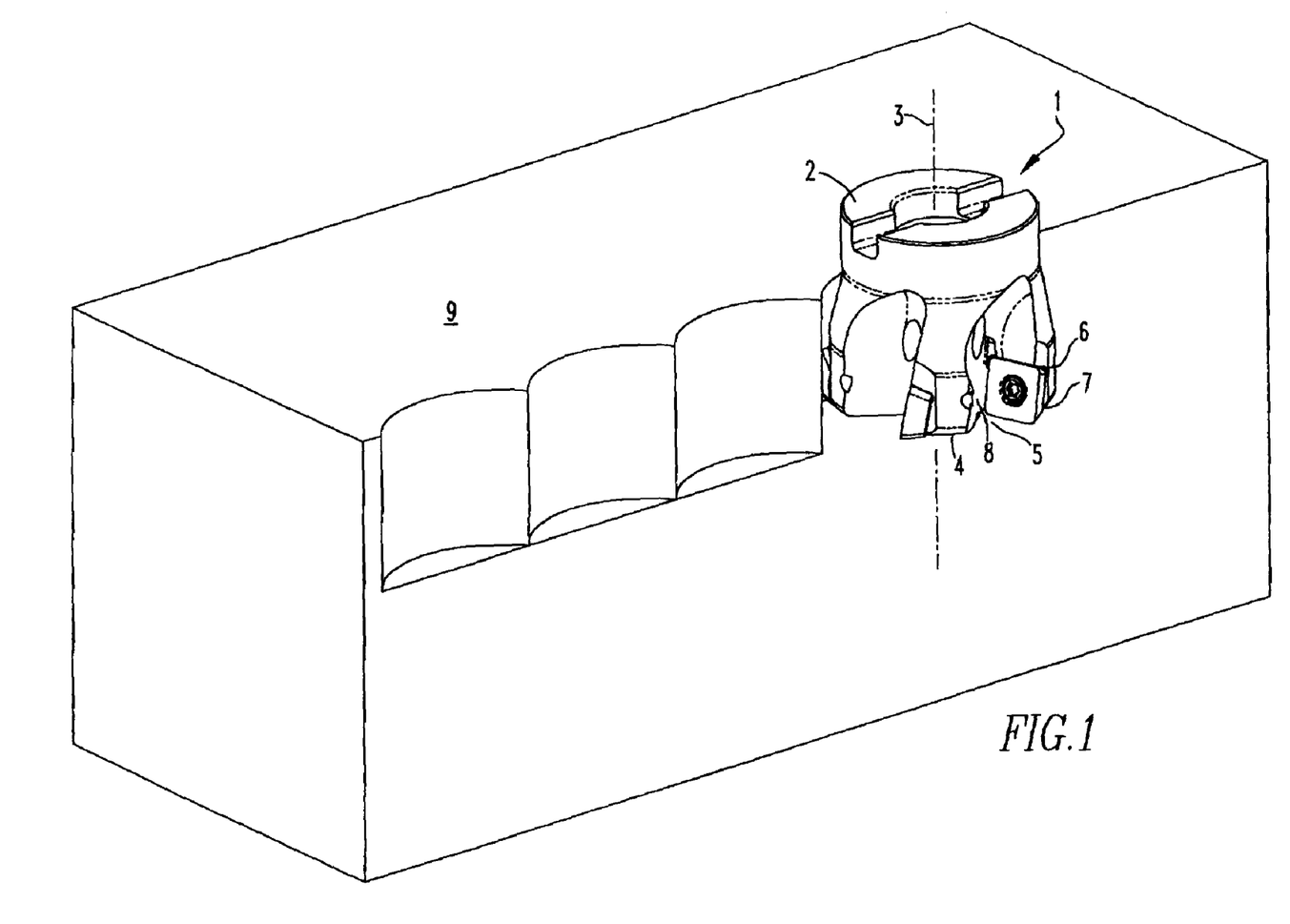
FIG. 1 is prior art and represents a perspective view of a rotating toolholder machining a workpiece.
Figure 2:
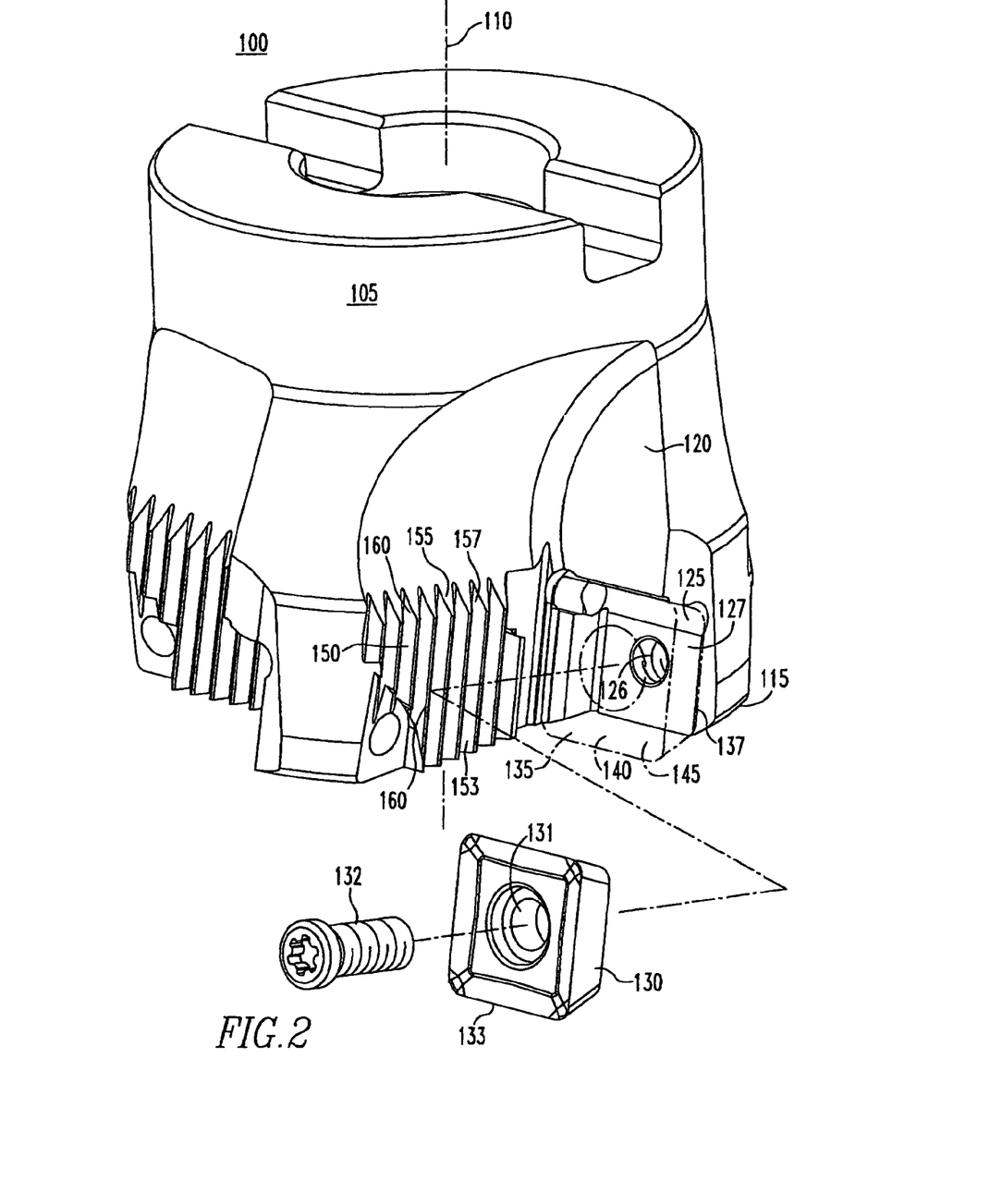
FIG. 2 is a perspective view of a toolholder in accordance with one embodiment of the subject invention.

FIG. 1 is prior art and illustrates a milling cutter 1 with a body 2 extending along a longitudinal axis 3. The body 2 has a first end 4 with a recess 5 extending therein. The recess 5 has an insert pocket 6 for receiving a cutting insert 7. There is at least one wall 8 adjacent to the pocket 6. In general, the purpose of the recess 5 is to provide clearance for chips that are produced during a metalworking operation upon the workpiece 9 as the body 2 rotates about the longitudinal axis 3.

The inventors have discovered that chip ejection from the work area may be influenced by features that may be present in one or more walls within the recess 5.

In particular, directing attention to FIGS. 2-5, a toolholder 100 is comprised of a body 105 which extends along a longitudinal axis 110 and has a first end 115. A recess 120 extends into the first end 115. The recess 120 has an insert pocket 125 adapted to receive a cutting insert 130. The cutting insert 130 may have a bore 131 extending therethrough to accept a mounting screw 132. The mounting screw 132 may be threadably engaged with a threaded bore 126 extending through a pocket floor 127 of the pocket 125.

A cutting insert envelope 135 defines the space in which the cutting insert 130 fits within the pocket 125. The envelope 135 has a bottom face 137 adjacent to the pocket floor 127 and a top face 140 opposite thereto defined by the top perimeter 145 of the envelope 135.

A first wall 150 located adjacent to the insert pocket 125 includes a portion 153 having a surface 155 with multiple interruptions 157 which form a chip ejection segment 160. The chip ejection surface 155, as illustrated in FIGS. 2-5, is generally parallel to the longitudinal axis 110. The chip ejection surface 155 may form a radial angle A (FIG. 4) with the pocket floor 127 of between 45-100 degrees. In a preferred embodiment the radial angle A is approximately 90 degrees.

Figure 6:
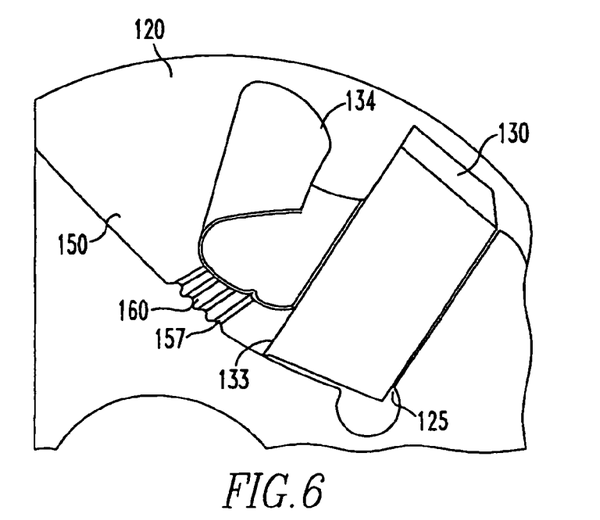
FIG. 6 is a view of a portion of the bottom of the milling cutter illustrated by the encircled portion, but furthermore, illustrates the one mechanism by which the chip ejection segment may function.

In one use of the subject toolholder illustrated in FIG. 6, with the cutting insert 130 mounted within the insert pocket 125, the bottom cutting edge 133 of the cutting insert 130 is engaged by the workpiece and the chips, such as chip 134, are directed against the chip ejection segment 160. At least one of the multiple interruptions 157 engages a chip 134 as it is being formed such that the chip 134 becomes resiliently compressed and, when the chip 134 finally separates from the workpiece, the chip 134 decompresses and springs away from the first wall 150 and is ejected from the recess 120. In this way, the chip ejection segment 160 causes the chip 134 to be ejected from the recess 120.

Figure 3:
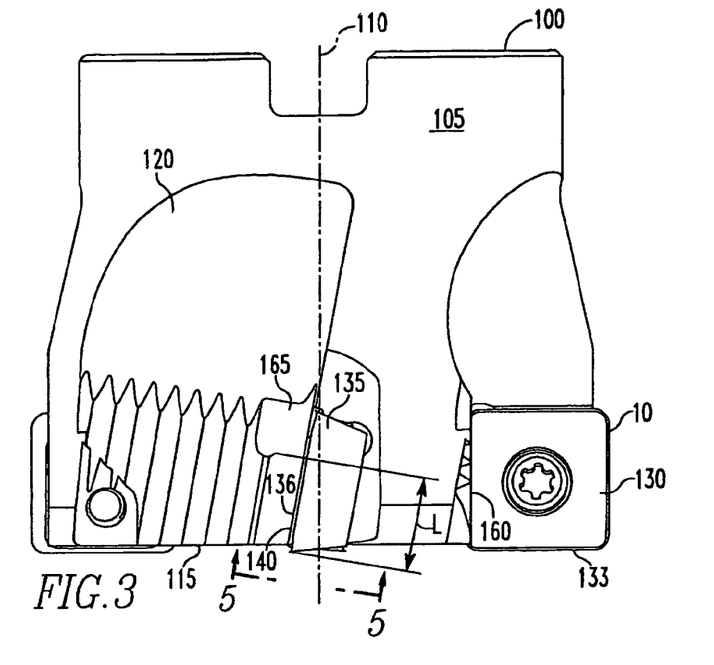
FIG. 3 is a side view of the toolholder illustrated in FIG. 2.
Figure 4:
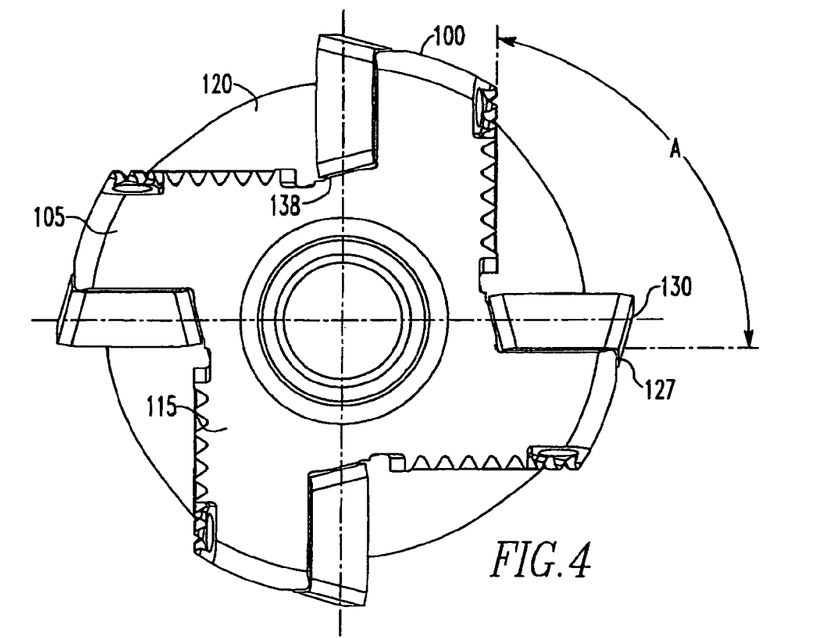
FIG. 4 is a bottom view of the toolholder illustrated in FIG. 2.
Figure 5:
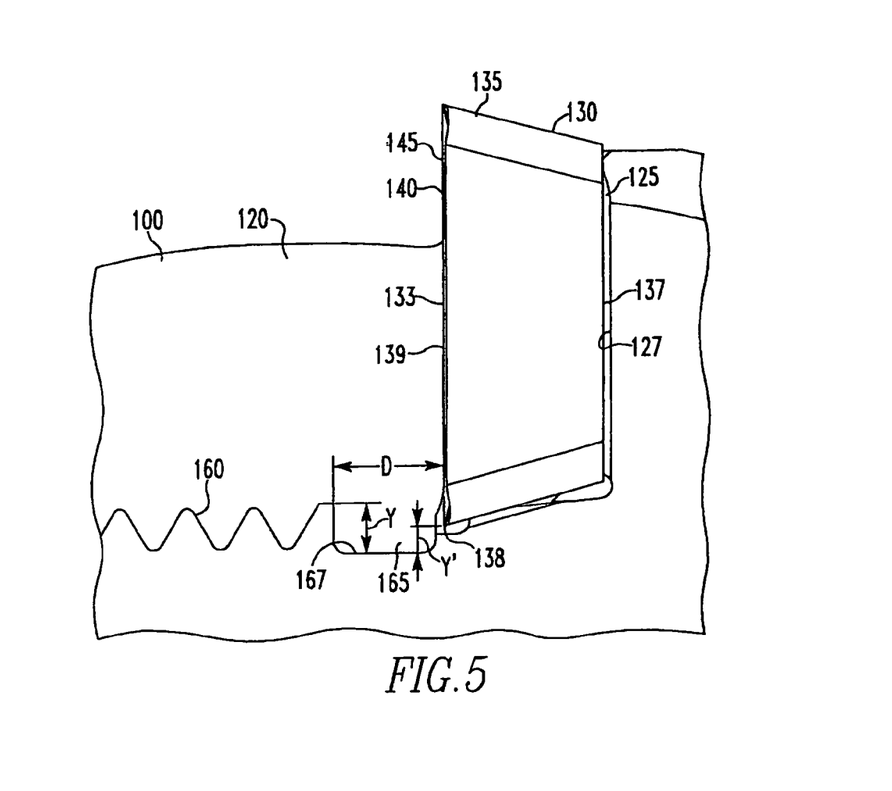
FIG. 5 is an enlarged view of the portion of the milling cutter indicated by arrows V-V in section 3.

FIG. 5 illustrates a side view of the toolholder 100 along arrows "5-5" in FIG. 3. The cutting insert 130 fits within the pocket 125. A cutting insert envelope 135 defines the space in which the cutting insert 130 fits within the pocket 125 and, for purposes of FIG. 5, the cutting insert envelope 135 and the cutting insert 130 are identical. The purpose of this distinction is to define the toolholder 100 independently from the cutting insert 130. The envelope 135 has a bottom face 137 adjacent to the pocket floor 127 and a top face 140 opposite thereto defined by the top perimeter 145 of the envelope 135. Between the chip ejection segment 160 and the cutting insert envelope 135 is a channel 165 that is adjacent to the top face 140 of the envelope 135. Channel 165 extends from the top face 140 of the envelope 135 a distance D to the chip ejection segment 160, wherein the distance D may be between 0.06 and 0.25 inches and preferably is between 0.06 and 0.14 inches. Additionally, the channel 165 may have a depth Y from the top of the chip ejection surface 155 to the bottom 167 of the channel 165 of between 0.01 and 0.12 inches with a depth Y of preferably between 0.01 and 0.06 inches. Additionally, there is a depth Y' from the most radially inward point 138 of the bottom edge 139 of the envelope 135 to the bottom 167 of the channel 165 of between 0.01 and 0.06 inches. The bottom edge 139 of the envelope corresponds to the bottom edge 133 (FIG. 3) of a cutting insert 130 that would be mounted in the pocket 125. The depth of the channel 165 promotes the formation of chips prior to contacting the chip ejection segment 160.

As illustrated in FIG. 3, the insert envelope 135 has a top face 140 adjacent to the channel 165 and the channel 165 may extend a length L partially along the top face 140 of the envelope 135. The channel 165 may extend a length L up to approximately ⅔ the length of the insert top face 140. The purpose of this design is to permit the chip 134 to have a greater clearance as it moves within the recess 120 of the toolholder 100. In the alternative, and once again directing attention to FIG. 3, it may be easily envisioned that the channel 165, instead of extending partially along the top face 140 of the insert 130, may become wider in a direction extending into the recess 120. The channel 165 tends to provide friction against the chip 134 to slow it down and promote engagement with the chip ejection segment 160.

Figure 7:
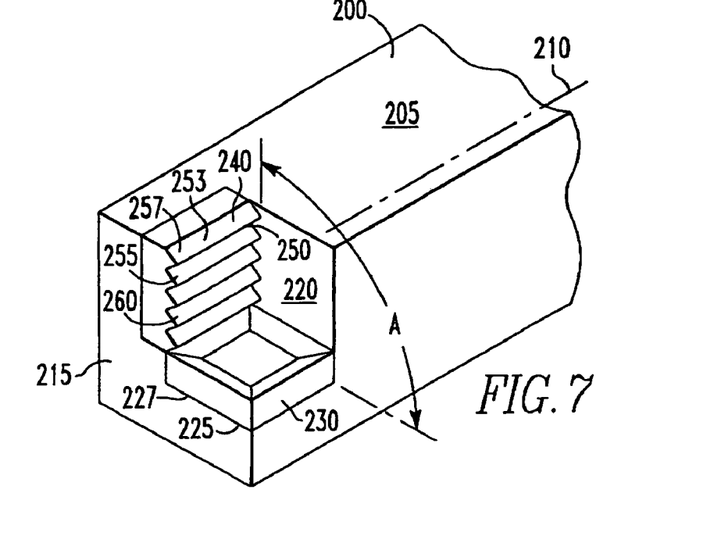
FIG. 7 is a perspective view of a toolholder in accordance with the second embodiment of the subject invention.

FIG. 7 illustrates a toolholder 200 for use in a metalworking operation having a toolholder body 205 extending along a longitudinal axis 210. The body 205 has a first end 215 with a recess 220 extending therein. An insert pocket 225 is adapted to receive a cutting insert 230. For purposes of clarity, although a shim may be used to support the cutting insert 230, however, such a shim is not illustrated.

A first wall 250 adjacent to the pocket 225 includes a portion 253 having a surface 255 with multiple interruptions 257 to form a chip ejection segment 260. Just as the arrangement disclosed with respect to FIGS. 2-5, the chip ejection surface 255 is generally parallel to the longitudinal axis 210. Furthermore, the insert pocket 225 has a pocket floor 227 and the chip ejection surface 255 forms a radial angle A with the pocket floor 227 of between 45-100 degrees in a fashion similar to that illustrated in FIG. 4. Once again, in a preferred embodiment, the radial angle A is approximately 90 degrees.

What has so far been disclosed is a chip ejection surface which is essentially parallel to the longitudinal axis of the toolholder. It is possible for the chip ejection surface to be oriented differently within the recess of the toolholder.

Figure 8:
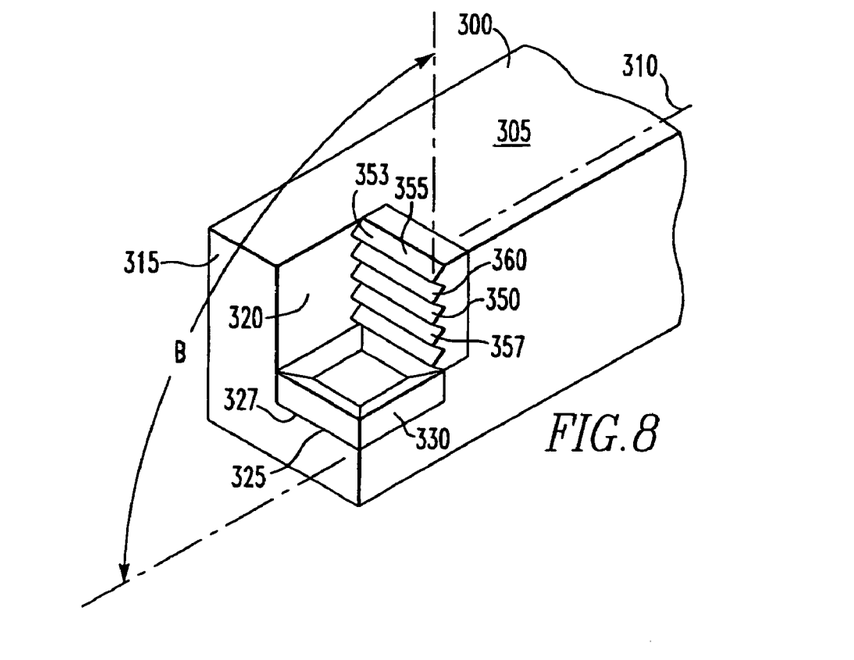
FIG. 8 is a perspective view of a toolholder in accordance with the third embodiment of the subject invention.

Directing attention to FIG. 8, a toolholder 300 for use in a metalworking operation has a body 305 extending along a longitudinal axis 310. The body 305 has a first end 315. A recess 320 extends from within the first end 315 and has an insert pocket 325 adapted to receive a cutting insert 330. The recess 320 has a first wall 350 adjacent to the pocket 325 with a portion 353 having a surface 355 with multiple interruptions 357 to form a chip ejection segment 360. However, unlike the arrangements disclosed in FIGS. 2-5 and FIG. 7, the chip ejection surface 355 is generally perpendicular, not parallel, to the longitudinal axis 310. The insert pocket 325 has a pocket floor 327. The chip ejection surface 355 forms a longitudinal angle B with the floor 327 of between 45-100 degrees. In a preferred embodiment, the longitudinal angle B is approximately 90 degrees. It should be appreciated that the body 105 of the toolholder 100, as illustrated in FIGS. 2-5, may be designed such that the chip ejection segment 160 is positioned to be perpendicular to the longitudinal axis 110 in a fashion similar to that illustrated in FIG. 8.

So far discussed has been the location of a chip ejection surface 155 in an orientation generally parallel to the longitudinal axis 110 (FIG. 2) and a chip ejection surface 355 generally perpendicular to the longitudinal axis 310 (FIG. 6). It is possible for a single toolholder to have a chip ejection segment oriented in both of these directions.

Figure 9:
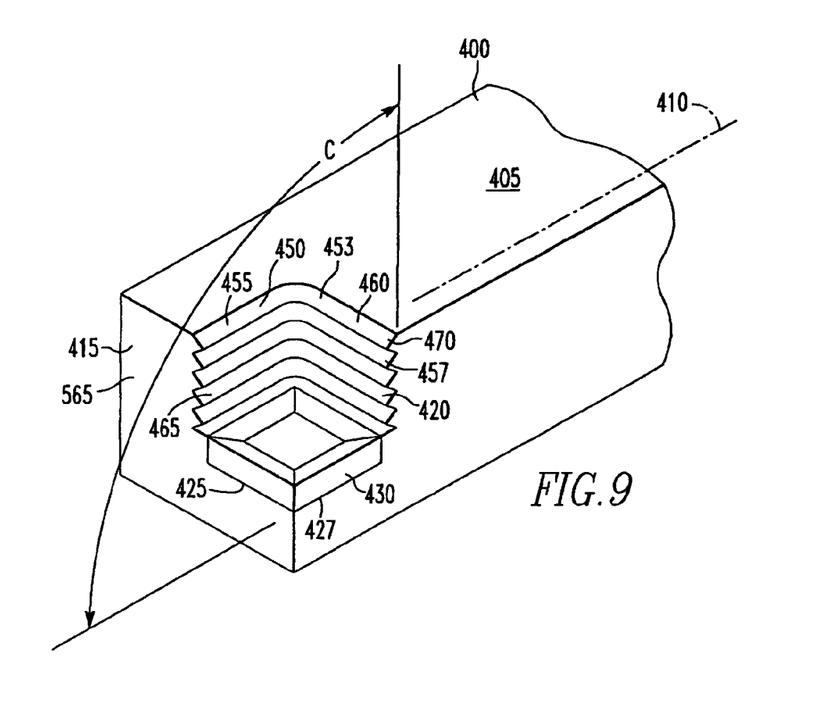
FIG. 9 is a perspective view of a toolholder in accordance with the fourth embodiment of the subject invention.

Directing attention to FIG. 9, a toolholder 400 for use in a metalworking operation has a body 405 extending along a longitudinal axis 410. The body has a first end 415 and a recess 420 extending therein. The recess has an insert pocket 425 adapted to receive a cutting insert 430. A wall 450 adjacent to the pocket 425 has a portion 453 with a surface 455 having multiple interruptions 457 to form a chip ejection segment 460 with a first portion 465 that is generally parallel to the longitudinal axis 410 and a second portion 470 that is generally perpendicular to the longitudinal axis 410.

Figure 10:
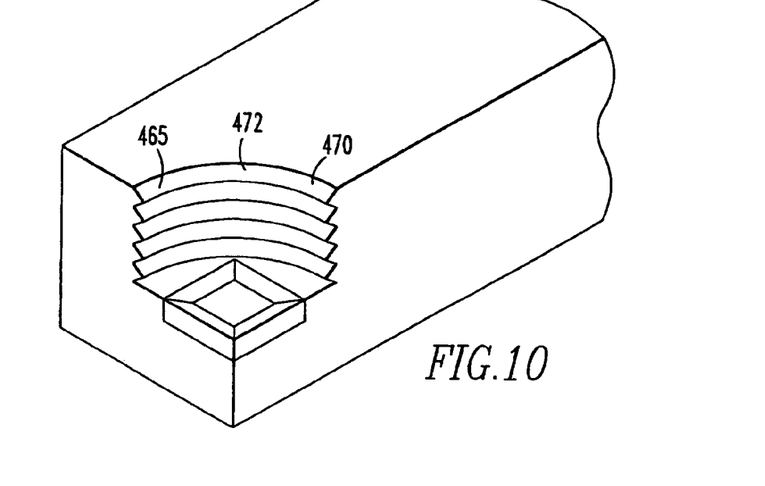
FIG. 10 is a portion of the perspective view of the toolholder in FIG. 7, but with the wall in the shape of an arc.

The insert pocket 425 has a floor 427 and the portions 465, 470 of the chip ejection segment 460 form an angle C with the floor 427 of between 45-100 degrees. In a preferred embodiment, the portions 465, 470 of the chip ejection segment 460 form an angle C with the floor 427 of approximately 90 degrees. It is possible for the first portion 465 and the second portion 470 of the chip ejection segment 460 to merge with one another to form an arc 472, as illustrated in FIG. 10.

Briefly returning to FIG. 2, it should be appreciated that the multiple interruptions 157 are imparted directly to the wall 135 of the toolholder body 105. On the other hand, with attention directed to FIG. 7, the chip ejection segment 260 is a discrete piece separate from the body 205 of the toolholder 210 such that it is possible to replace the chip ejection segment 260 by merely changing the discrete part. In each instance of a chip ejection segment 260 found within the subject application, it should be understood that the chip ejection segment 260 may either be integral with the body of the toolholder or, in the alternative, may be a discrete part that is secured to the body of the toolholder. As can be seen from inspection of FIG. 7, the toolholder 200 has a body 205 which is rectangular and, as a result, this toolholder 200 is generally referred to as a square shank toolholder. On the other hand, directing attention to FIG. 2, the toolholder 100 is a rotating toolholder and in this figure is a milling cutter.

So far described has been the positioning of a chip ejection segment within the recess of a toolholder body. Now attention will be directed to the configuration of the chip ejection segment itself.

Figure 11:
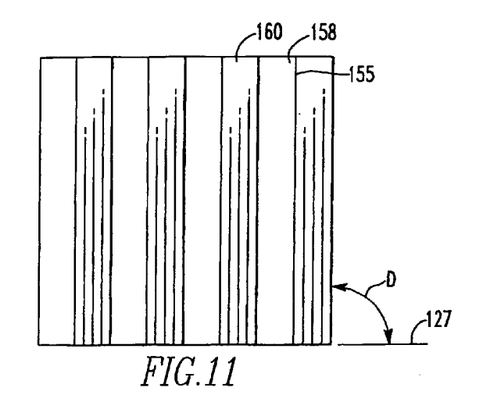
FIGS. 11-19 represent different multiple interruptions that act as chip ejection segments.
Figure 11A:
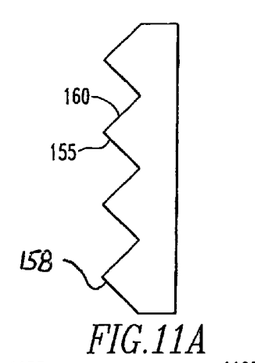
FIG. 11A is a side view of FIG. 11 showing the profile of the interruptions.
Figure 12:
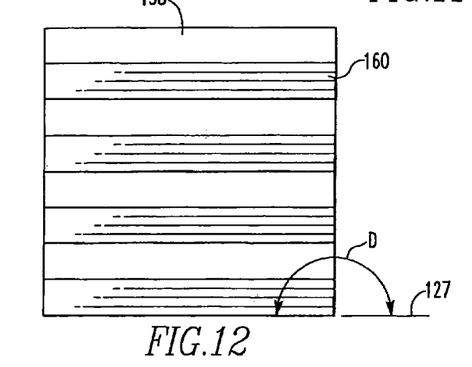
Figures 13, 14:
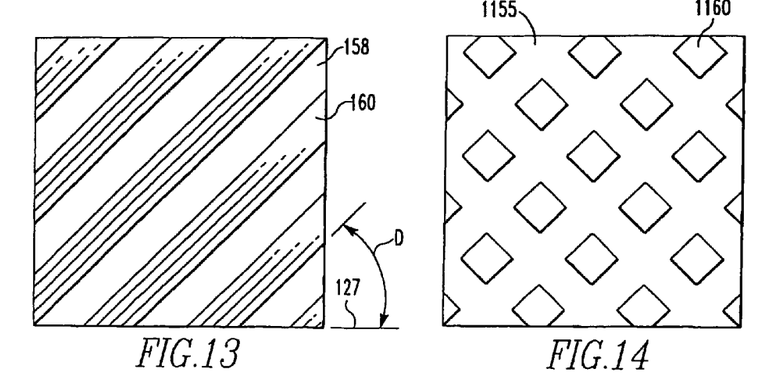

FIG. 11 illustrates an enlarged sketch of a portion of the surface 155 of the chip ejection segment 160 shown in FIGS. 2-5. Directing attention to FIGS. 11, 12 and 13, the floor 127 of the pocket is indicated by a line and the chip ejection segment 160 is comprised of a plurality of spaced-apart grooves 158 forming an angle D with a pocket floor 127 of between 0-180 degrees. In particular, FIG. 11 illustrates the angle D at 90 degrees, FIG. 12 illustrates the angle D at 180 degrees, while FIG. 13 illustrates the angle D at approximately 45 degrees. FIG. 11A is a side view of FIG. 11 illustrating the profile of the spaced-apart grooves 158. The profile of the grooves 162 may be similar to the grooves found in different chip ejection profiles in FIGS. 12-17. However, it should be noted that the purpose of such grooves is to snag the chip as it is being formed to force the chip to resiliently compress and then, upon breaking, to resiliently expand and be expelled from the recess.

FIG. 14 is an enlarged sketch of a portion of the chip ejection segment 1160 having a surface 1555 with a knurled pattern.

Figure 15:
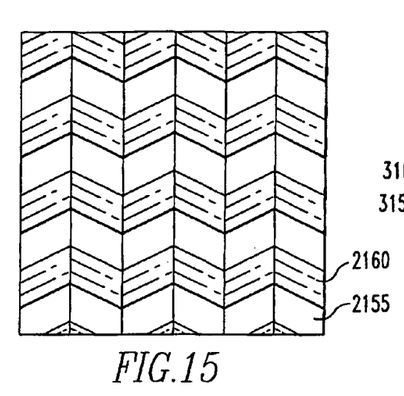

FIG. 15 illustrates an enlarged sketch of a portion of a chip ejection segment 2160 having a surface 2155 with a plurality of grooves which define a saw tooth pattern.

Figure 16:
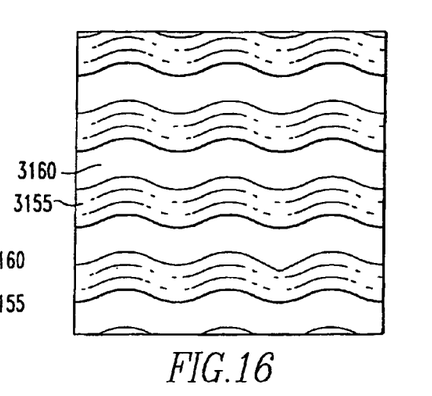

FIG. 16 illustrates an enlarged sketch of a portion of a chip ejection segment 3160 having a surface 3155 comprised of a plurality of grooves arranged in a wavy pattern.

Figure 17:
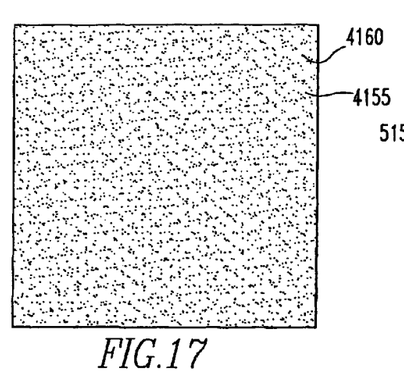

FIG. 17 illustrates an enlarged sketch of a portion of a chip ejection segment 4160 having a surface 4155 which is made of abrasives such as, for example, sandpaper.

Figure 18:
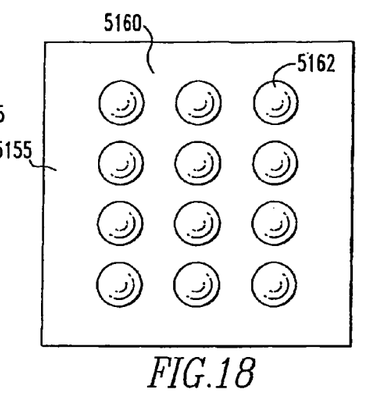

FIG. 18 illustrates an enlarged sketch of a portion of a chip ejection segment 5160 having a surface 5155 comprised of a plurality of projections 5162 thereby defining a bumpy surface.

Figure 19:
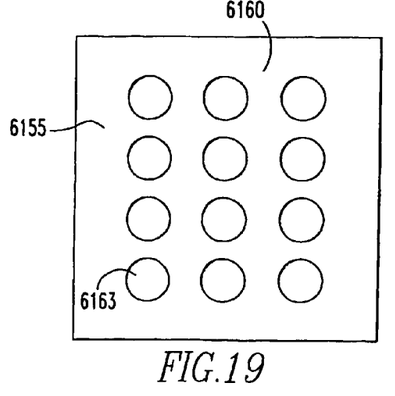

FIG. 19 is an enlarged sketch of a portion of a chip ejection segment 6160 comprised of a surface 6155 having a plurality of depressions 6163.

Each of the surfaces identified in FIGS. 11-19 may be oriented upon the toolholder wall in any manner appropriate to effectively eject chips during a metalworking operation.

Finally, the subject application is directed to a method of imparting to a toolholder 100 a chip ejection segment 160 for use in a metal cutting operation. The toolholder 100 has a body 105 extending along a longitudinal axis 110. The body has a first end 115 and a recess 120 extending into the first end 115 with an insert pocket 125 therein. The insert pocket 125 is adapted to receive a cutting insert 130. The method comprises the step of imparting within at least one wall 150 within the recess 120 and adjacent to the pocket 125 a surface 155 with multiple interruptions 157 to form a chip ejection segment 160.

While specific embodiments of the invention have been described in detail, it will be appreciated by those skilled in the art that various modifications and alternative to those details could be developed in light of the overall teachings of the disclosure. The presently preferred embodiments described herein are meant to be illustrative only and not limiting as to the scope of the invention which is to be given full breadth of the appended claims and any and all equivalents thereof.

The invention claimed is:

1. A milling cutter for use in a metalworking operation comprising:
    a) a generally cylindrical body extending along a longitudinal axis, wherein the body has a periphery and a first end;
    b) at least two recesses extending into the first end, wherein each recess has
        1) an insert pocket adapted to receive a cutting insert, wherein the pocket is radially open at the periphery of the body, wherein the entire pocket is located away from the longitudinal axis and, wherein the pocket is positioned symmetrically about the longitudinal axis relative to other pockets; and
        2) at least one wall adjacent to and separate from the pocket with a portion of the wall having a surface with multiple interruptions to form a chip ejection segment; and
    c) a channel between the chip ejection segment and the insert pocket.

2. The milling cutter in accordance with claim 1, wherein the portion of the wall with the chip ejection segment is an integral part of the body.

3. The milling cutter in accordance with claim 1, wherein the portion of the wall with the chip ejection segment is a discrete part removably attached to the body.

4. The milling cutter in accordance with claim 1, wherein the segment of the chip ejection surface is generally parallel to the longitudinal axis.

5. The milling cutter in accordance with claim 4, wherein the insert pocket has a floor and a plane defined by the top surfaces of the multiple interruptions of the chip ejection segment forms a radial angle A with the pocket floor of between 45-100 degrees.

6. The milling cutter in accordance with claim 5, wherein the chip ejection segment forms a radial angle A with the floor of approximately 90 degrees.

7. The milling cutter in accordance with claim 1, wherein the chip ejection segment is generally perpendicular to the longitudinal axis.

8. The milling cutter in accordance with claim 7, wherein the insert pocket has a floor and a plane defined by the top surfaces of the multiple interruptions of the chip ejection segment generally perpendicular to the longitudinal axis forms a longitudinal angle B with the floor of between 45-100 degrees.

9. The milling cutter in accordance with claim 8, wherein the chip ejection segment forms a longitudinal angle B with the floor of approximately 90 degrees.

10. The milling cutter in accordance with claim 1, wherein the insert pocket has a floor and wherein the toolholder further includes:
    a) a cutting insert envelope defining the space in which a cutting insert would fit within the insert pocket, wherein the envelope has a bottom face adjacent to the pocket floor and a top face opposite thereto defined by the perimeter of the envelope; and
    b) wherein the channel is spaced from the top face of the envelope.

11. The milling cutter according to claim 10, wherein the channel is spaced from the top face of the envelope by a distance D of between 0.06 and 0.25 inches.

12. The milling cutter according to claim 11, wherein the channel is spaced from the top face of the envelope by a distance D of between 0.06 and 0.14 inches.

13. The milling cutter according to claim 10, wherein the channel has a depth Y of between 0.01 and 0.06 inches.

14. The milling cutter according to claim 13, wherein the channel has a depth Y of between 0.01 and 0.03 inches.

15. The milling cutter according to claim 10, wherein the channel has a depth from the most radially inward point of a bottom edge, of the envelope to the bottom of the channel of between 0.01 and 0.06 inches.

16. The milling cutter according to claim 10, wherein the envelope has a side adjacent to the channel and the channel extends partially along the side of the envelope.

17. The milling cutter according to claim 16, wherein the envelope has a side adjacent to the channel and the channel becomes wider in a direction extending into the insert pocket.

18. The milling cutter in accordance with claim 1, wherein the pocket has a floor and wherein the chip ejection segment is comprised of a plurality of spaced-apart grooves forming an angle D with the pocket floor of between 0-180 degrees.

19. The milling cutter in accordance with claim 18, wherein the angle is approximately 90 degrees.

20. The milling cutter in accordance with claim 18, wherein the angle is approximately 180 degrees.

21. The milling cutter in accordance with claim 18, wherein the angle is approximately 45 degrees.

22. The milling cutter in accordance with claim 1, wherein the chip ejection segment is comprised of a knurled surface.

23. The milling cutter in accordance with claim 1, wherein the chip ejection segment is comprised of a plurality of grooves having a saw tooth pattern.

24. The milling cutter in accordance with claim 1, wherein the chip ejection segment is comprised of a plurality of grooves having a wavy pattern.

25. The milling cutter in accordance with claim 1, wherein the chip ejection segment is comprised of an abrasive surface.

26. The milling cutter in accordance with claim 1, wherein the chip ejection segment is comprised of a surface with a plurality of projections.

27. The milling cutter in accordance with claim 1, wherein the chip ejection segment is comprised of a surface with a plurality of cavities.

28. A toolholder for use in a metalworking operation comprising:
   a) a body extending along a longitudinal axis, wherein the body has a first end;
   b) a recess extending into the first end, wherein the recess has
      1) an insert pocket adapted to receive a cuffing insert; and
      2) at least one wall adjacent to and separate from the pocket with a portion of the wall having a surface with multiple interruptions to form a chip ejection segment, wherein the chip ejection segment has a first portion with a surface that is generally parallel to the longitudinal axis and a second portion with a surface that is generally perpendicular to the longitudinal axis.

29. The toolholder in accordance with claim 28, wherein the insert pocket has a floor and the first portion and the second portion of the chip ejection segment each form an angle C with the floor of between 45-100 degrees.

30. The toolholder in accordance with claim 29, wherein the first portion and the second portion of the chip ejection segment each form an angle C with the floor of approximately 90 degrees.

31. The toolholder according to claim 28, wherein first portion and the second portion merge with one another to form an arc.

32. The toolholder in accordance with claim 28, wherein the toolholder is a square shank toolholder.

33. A toolholder system for use in a metalworking operation comprising:
   a) a milling cutter having
      1) a generally cylindrical body extending along a longitudinal axis, wherein the body has a periphery and a first end;
      2) at least two recesses extending into the first end, wherein each recess has
         i) an insert pocket adapted to receive a cutting insert, wherein the pocket is radially open at the periphery of the body, wherein the entire pocket is located away from the longitudinal axis and, wherein the pocket is positioned symmetrically about the longitudinal axis relative to other pockets; and
         ii) a wall adjacent to the pocket, wherein the wall is separate from the pocket and has a surface with multiple grooves in a direction generally parallel to the longitudinal axis to form a chip ejection segment;
   b) a cutting insert mounted within the pocket of the milling cutter with a usable cutting edge extending beyond the first end of the body;
   c) wherein the chip ejection segment is adjacent to the usable cutting edge of the insert; and
   d) a channel between the chip ejection segment and the cutting insert, wherein the channel is spaced from the usable cutting edge of the insert.

34. A method of imparting to a toolholder a chip ejection segment for use in a metalcutting operation, wherein the toolholder has a generally cylindrical body extending along a longitudinal axis and, wherein the body has a periphery and a first end and at least two recesses extending into the first end, wherein each recess has an insert pocket therein adapted to receive a cuffing insert, wherein the pocket is radially open at the periphery of the body, wherein the entire pocket is located away from the longitudinal axis and, wherein the pocket is positioned symmetrically about the longitudinal axis relative to other pockets, the method comprising the step of imparting within at least one wall within the recess and adjacent to the pocket a surface with multiple interruptions to form a chip ejection segment and a channel between the chip ejection segment and the cuffing insert pocket.

* * * * *